US008260693B2

(12) United States Patent
Griffin et al.

(10) Patent No.: US 8,260,693 B2
(45) Date of Patent: Sep. 4, 2012

(54) VISUAL CUES FOR IDENTIFYING FINANCIAL ACCOUNTS

(75) Inventors: Maura L. Griffin, Atlanta, GA (US); Lee A. Streu, Charlotte, NC (US); Caroline B. Stott, Gastonia, NC (US); Brent B. Allen, Charlotte, NC (US); Colleen M. Buckles, Discovery Bay, CA (US); Gerald V. Yuille, Washington, DC (US); Tamara S. Kingston, Peoria, AZ (US); Deborah M. Winick, Carmel, CA (US)

(73) Assignee: Bank of America Corporation, Charlotte, NC (US)

( * ) Notice: Subject to any disclaimer, the term of this patent is extended or adjusted under 35 U.S.C. 154(b) by 829 days.

(21) Appl. No.: 11/813,826

(22) PCT Filed: Jan. 12, 2006

(86) PCT No.: PCT/US2006/001161
§ 371 (c)(1),
(2), (4) Date: Jul. 12, 2007

(87) PCT Pub. No.: WO2006/076532
PCT Pub. Date: Jul. 20, 2006

(65) Prior Publication Data
US 2008/0301015 A1  Dec. 4, 2008

(51) Int. Cl.
*G06Q 10/00* (2012.01)
(52) U.S. Cl. .................................................. 705/33
(58) Field of Classification Search .................. 705/33
See application file for complete search history.

(56) References Cited

U.S. PATENT DOCUMENTS

| 5,848,426 | A | 12/1998 | Wang et al. | |
|---|---|---|---|---|
| 6,108,672 | A | 8/2000 | DeJoseph | |
| 2002/0161706 | A1* | 10/2002 | Brinskele et al. | 705/41 |
| 2004/0162778 | A1* | 8/2004 | Kramer et al. | 705/40 |
| 2004/0181516 | A1 | 9/2004 | Ellwanger et al. | |

FOREIGN PATENT DOCUMENTS

WO  03032130 A2  4/2003

OTHER PUBLICATIONS

Bank of America Corporation, Australian Patent Office Written Opinion, issued in corresponding Singapore Patent Application No. SG 200705732-6.

(Continued)

*Primary Examiner* — Shay S Glass
(74) *Attorney, Agent, or Firm* — Michael A. Springs; Moore and Van Allen, PLLC; Ryan P. Harris

(57) ABSTRACT

Visual cues for identifying financial accounts. A distinctive visual cue, such as a specific color, is applied to an account from among a plurality of accounts, such as associated joint and individual checking accounts. The designation can be applied to statements, and optionally also checks, check/ATM cards, and other materials can be identified at a glance. Additionally confidential flag can be applied to an account as part of the designation, to provide extra notice to both personnel and various systems that an individual account is confidential within the associated accounts. A system for assigning distinctive visual cues to accounts can include a customer or account information database for storing plurality of possible distinctive visual cues, and one or more fulfillment subsystems for providing bank statements, checks, deposit slips, check cards, and the like.

43 Claims, 4 Drawing Sheets

OTHER PUBLICATIONS

Bank of America Corporation, Written Opinion and PCT International Search Report, issued in corresponding International Patent Application No. PCTUS2006/001161, Nov. 27, 2007.

U.S. Appl. No. 10/389,275, filed Sep. 16, 2004.

Extended European Search Report mailed Jul. 23, 2010 for European Application No. 06718255.0.

* cited by examiner

VISUAL CUES FOR IDENTIFYING FINANCIAL ACCOUNTS

BACKGROUND ART

Many households have two or more adults who maintain separate checking or other types of financial accounts. In a large number of these households, those checking accounts are maintained at separate banks. In such a situation, the household maintains the flexibility of having an account for each person's use, but at a cost of having to maintain two minimum balances, and in some cases having to pay two sets of fees.

Some financial institutions currently offered "bundled" accounts. In some cases, these can be set up as a single joint account and a plurality of associated individual accounts. Various combinations of savings, checking, and even retirement and credit accounts can be offered in this way, so that amounts can be aggregated to meet minimum balance requirements, and for overdraft protection. However, account materials, such as bank statements and checkcards, may look substantially identical, leading to confusion as to which goes with which account.

DISCLOSURE OF INVENTION

Embodiments of the present invention provide for a distinctive visual cue for each account from among financial accounts, such as associated joint and individual checking accounts. For example, a different distinctive visual cue such as a color, background, icon, or graphic can be assigned to each account, so that statements, and optionally also peripheral items or documents such as checks, check/ATM cards, and other materials can be identified at a glance.

A method of producing statements for a plurality of financial accounts using the distinctive visual cue can include establishing the distinctive visual cue identifying an account from among the plurality of financial accounts, and producing a statement for each account, each statement incorporating the appropriate distinctive visual cue so that the account-holder can identify the account from among the plurality of financial accounts. In at least some example embodiments, this visual cue can be a color. For example, if a household has associated "yours, mine, and ours" accounts, being two individual and one joint checking account, the materials for each account would be a different, assigned color. This color can even be carried through to the envelopes for statements and other account mailings.

Optionally, this distinctive visual cue can be displayed as part of the screen display for on-line statements or an on-line banking system or Web site. Further, for example, the visual cue can optionally be carried on peripheral items such as checks, check cards and other material such as deposit slips. In at least some embodiments, a confidential flag can be applied to an account that is assigned to an individual account holder, and this flag can be propagated through the systems of the financial institution. This flag would provide extra notice to both personnel and the institutions various systems, such as the transactions database system, that an individual account is confidential within the associated accounts. Such confidentiality may be desired, for example, to keep other household members from acquiring advance notice of gift or other surprise purchases by an account-holder.

Associated accounts that are to make use of the invention can be setup as a group, or an individual account can be added to a bundle for an existing account-holder or customer. When the visual cue is established for an account, peripherals can be produced for the new account wherein at least some of the peripherals incorporate the distinctive visual cue the peripherals are provided to the account-holder so that the account-holder can identify the account from among the plurality of financial accounts based on the visual cue. If an account is being added to an existing bundle, an appropriate visual cue may be able to be retrieved from an account profile if the customer has already reserved visual cues for accounts. Alternatively, a visual cue can be selected from a library of possible visual cues.

In example embodiments, a system for assigning distinctive visual cues to financial accounts can include a customer information database for storing plurality of possible distinctive visual cues, and one or more fulfillment subsystems for providing bank statements, checks, deposit slips, check cards, etc. for each account. Documents incorporating and/or resulting from an embodiment of the invention would include both account information and the distinctive visual cue identifying an account from among the plurality of financial accounts. Such documents could be paper documents, or documents that are electronically stored on a computer readable medium, such as for use in an on-line banking system. Such documents can be statements or peripheral items.

BEST MODE(S) FOR CARRYING OUT THE INVENTION

Figure 1:
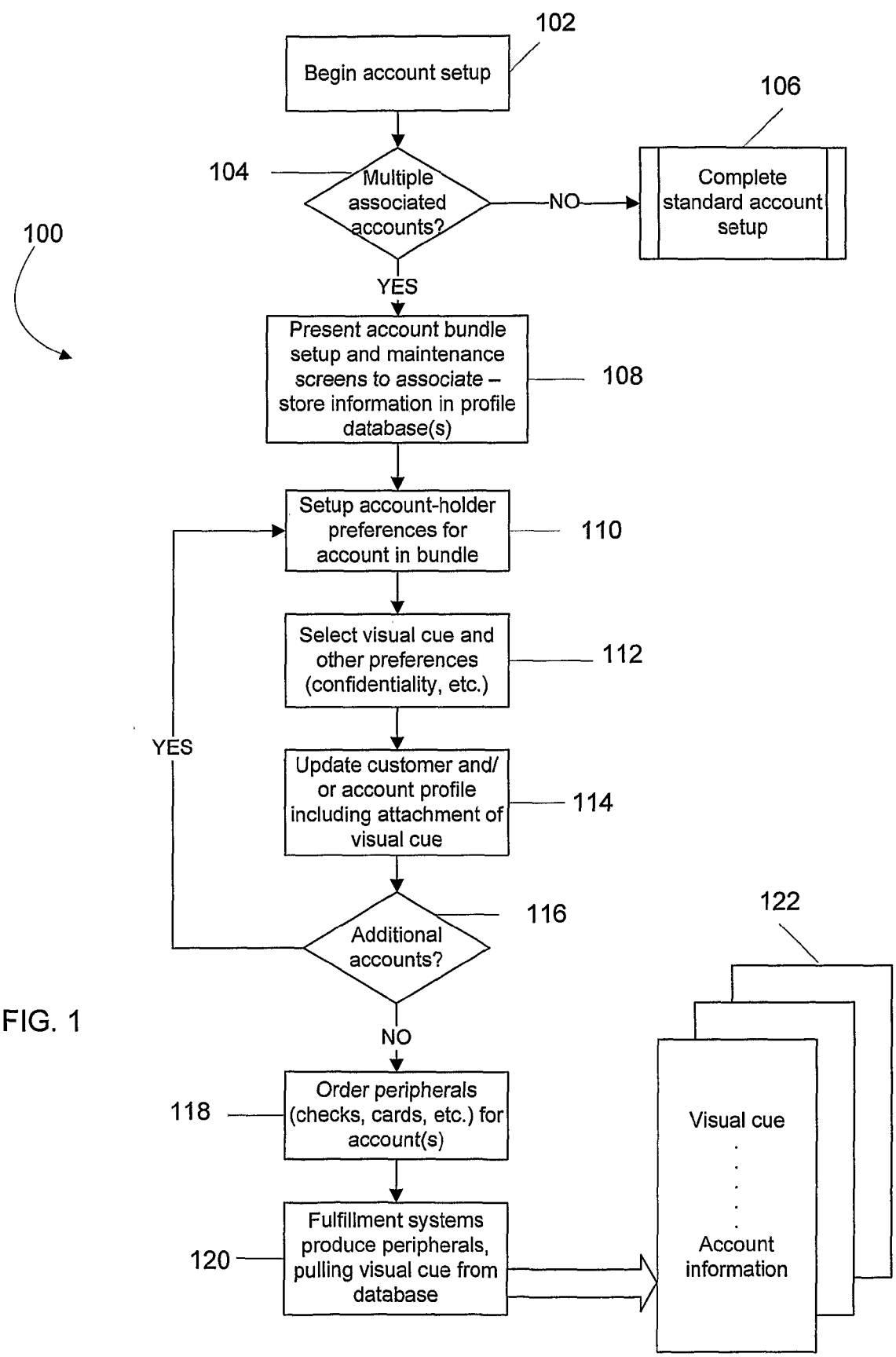
FIG. 1 is a flowchart illustrating the setup process for associated accounts that are to use distinctive visual cues according to at least one embodiment of the invention.

The present invention will now be described in terms of specific example embodiments. It is to be understood that the invention is not limited to the example embodiments disclosed. It should also be understood that not every feature of the methods and systems described is necessary to implement the invention as claimed in any one of the amended claims. Also, throughout this disclosure, where a process or method is shown or described, the steps of the method may be performed in any order or simultaneously, unless it is clear from the context that one step depends on another being performed first. Additionally, there can be significant time lag between steps.

It may be helpful for the reader to understand some definitions of terms from this point forward. Other terms are intended to have their ordinary meaning within the relevant art, or will be defined when first introduced. It should be understood that terms like "bank" and "financial institution" as well as terms like "account" are used herein in their broadest sense. Institutions, organizations, and corporations that maintain various types of financial accounts are widely varied in their organization and structure, as well as are the accounts themselves. These terms are intended to encompass all possibilities, including but not limited to finance companies, stock brokerages, credit card companies, telephone companies, mortgage companies, manufacturers who provide financial services associated with the purchase of goods, etc. For example, an account at a telecommunications company such as a long distance provider can be considered an account or a financial account for purposes of this disclosure, and embodiments of the invention could be applied to calling cards and telephone bills. Financial accounts may be referred to herein as "bundled" or "associated" or in similar ways. Such references are will likely invoke a situation in which persons within a home or otherwise within a small group of individuals maintain multiple accounts with a financial institution. In example embodiments these accounts are associated, linked, or bundled for purposes of fees, overdraft protection, etc. A typical example would be a family that maintains a joint checking or savings account, as well as individual checking accounts for spouses. However, arrangements where individual savings or checking accounts are also maintained for children or other relatives, or even unrelated persons or entities are not intended to be excluded.

In addition to the above examples of associated accounts, the terms bundled and/or associated may also apply to other situations. For example, multiple departments or organizations within an enterprise or company may have distinct, linked accounts, and embodiments of the invention could be useful in such a situation. Embodiments of the invention may also be used where accounts are not tied together in some technical fashion, but an individual or entity wishes to readily identify account materials from other papers and items, such as where mail for multiple persons or organizations is simply received at the same address.

Embodiments of the invention contemplate attaching a "visual cue" to each account from within a plurality of accounts. The purpose of this visual cue is to facilitate ready identification of materials as being those of a specific account or account-holder. Thus, all materials or documents directed to that account-holder can be readily recognized and distinguished from materials and documents for other account-holders. It should be noted that the visual cues can be assigned on the basis of an account or the account-holder, thus, if that account-holder has multiple accounts the same visual cues can be used for all. Such a visual cue may simply be a color that is associated with an account or account-holder so that statements and other materials are printed on stock of the particular color. Alternatively, visual cues can be backgrounds, icons, graphical designs, or any other visual indication that could serve this purpose. Embodiments of the invention contemplate that a visual cue will be distinctive from other visual cues in an account bundle, or generally, but not necessarily unique across all accounts within a financial institution. For example, as part of an account setup process, the financial institution could provide access to a library of selectable visual cues for each customer.

References are made throughout this disclosure to "documents" as well as "peripherals" and "statements." The term document is intended to refer to any document that is produced for or associated with any account or account-holder. A statement is one type of document, and the term statement is intended in its usual sense, to refer to a document that lists transactions. It should be remembered that such documents can take many forms, for example a utility statement or telephone bill. Items that do not list transaction detail such as checks, deposit slips, check cards, ATM cards, credit cards, checkcards, calling cards, etc. are referred to as peripheral items, peripheral documents, or simply "peripherals." Documents as contemplated by this disclosure can be in electronic or paper form. Documents are usually embodied in a medium such as paper, or computer readable medium such as magnetic tape or optical disk. Documents can, of course, include Emails and Web pages.

For purposes of the example embodiments of the invention described herein, it can be assumed that the use of visual cues is tied to a bundle of accounts consisting of a single joint and two individual checking accounts. Such an account bundle might be called a "yours mine and ours" (YMO) account service. The visual cue or designation in such a circumstance can extend to paper statements, checks, and even envelopes for statements and peripherals. Additionally the designation may extend to online screens, ATM screens, checkcards, ATM cards, credit cards, or any other account materials. In example embodiments colors can be chosen for the visual cue. For example one color would designate one of the individual accounts, a second color would designate another of the individual accounts, and a third color would designate the joint account. However, logos, photos, designs, backgrounds, and any other graphic or graphical element can be used. As one example, an affinity logo like that typically found on many credit cards today could be used as a visual cue for an account.

Embodiments of the invention also contemplate a confidentiality flag or indicator as an extra indication that an individual (as opposed to a joint) account is confidential from other account-holder(s) in a bundle of accounts. Although the fact that an account is a single-ownership account would normally indicate confidentiality, a flag can be used to provide extra security. A confidentiality flag may be incorporated into a visual cue, or may otherwise, or in addition, exist elsewhere in the bank's systems as a reminder that an account in a bundle or associated group of accounts is an individual account and that confidentiality is to be maintained. Such a flag adds extra assurance that associates and employees of the financial institution do not disclose information regarding that account to another partner in the account service relationship. The flag could also be used on joint accounts to ensure confidentiality as to other accounts in the bundle.

FIG. 1 is a flowchart illustrating an example process for setting up the use of visual cues with associated accounts following the YMO service example. As with most flowcharts, the various portions of the process are designated with subprocess or process blocks. Process 100 begins at block 102 when an account setup is initiated. At block 104, processing branches to block 106 if a customer chooses not to avail themselves of an associated account product or service. Otherwise, processing branches to block 108 where a new account system presents the various setup and maintenance screens to an associate at a financial institution. These screens could optionally be presented to the customer via an on-line application form or the like, as is understood in the art. Entry of information into these screens results in appropriate information being stored in databases, such as a customer information database and/or an account information database, as these databases are known in the art. In some embodiments, these two databases may be unified. For convenience, the terms "customer information database" and "account information database" used herein individually should be treated as referring to either type of database, or a combination of the two. Also, with regard to the information stored in these databases, the terms "customer profile" and "account profile" can be used interchangeably to refer to data stored in either type of database.

Still referring to FIG. 1, at block 110, the account holder preferences for each account in the bundle are set up. It should be noted that these preferences could be set up on either an account-by-account basis or on an account-holder-by-account-holder basis. If the latter technique is used, additional account-holders and accounts, even different types of accounts such as credit card accounts, could be set up to use the same visual cue selected for YMO accounts. Thus, anytime a new account is added for a specific account-holder, or for the account holders jointly, the appropriate visual cue could be accessed in the customer information or account information database. Normally, joint account-holders will select a single visual cue for their joint account. At block 112, the appropriate visual cue and other preferences, such as the confidentiality flag, are selected by the customer and input by whoever is setting up the account. If this is a first time setup, the financial institution can provide a library of acceptable visual cues to be included in the various materials for each account. For example, if colors are being used as visual cues, the library might consist of a color picker. Alternatively, if icons, backgrounds, or other complex designs can be used as visual cues, these could be stored graphically in a database that is accessible by a new account setup system. In this example, once a cue is picked by an account-holder within the household, it cannot be chosen by another account-holder within the same household. At block 114 of FIG. 1, customer and or account profile information is updated in the appropriate databases according to the selections the customer(s) have made. If additional accounts from the bundle need to be set up at block 116, processing branches back to the selection of account holder preferences at block 110. Otherwise processing continues to block 118.

Continuing to refer to block 118 of FIG. 1, peripherals are ordered. These include checks, check cards, and any other items that are sent to an account holder when a new account is opened. Some or all of these materials can incorporate the visual cue selected above, and in some cases can also incorporate a confidentiality flag for individual accounts. At block 120, the appropriate fulfillment systems produce the materials, pulling the appropriate visual cue or designator from the account information and/or customer information database. Materials which are documents embodied on a medium are represented graphically by media 122 of FIG. 1 wherein each medium includes the visual cue, and the appropriate account information. For example, if the document is checks, the account information includes routing and transit numbers, account holder names, etc. For a checkcard, the account information includes the account number and name of the account-holder.

Some additional considerations that some financial institutions will need to take into account when opening accounts using visual cues as described above include provisions for allowing account-holders to determine which account is to be accessed at a point-of-sale. Additionally, other options may be presented during the process, for example, which accounts are to be accessible from ATM's via the ATM or check cards issued to each account holder. There may be a desire to limit the various statements that will need to be sent to a single address. Alternatively, more flexibility can be provided to customers by allowing the different account statements to be sent to different addresses. This flexibility would allow the accommodation of college students, temporary living arrangements, etc. Finally, if color is being used as a visual cue, it may be necessary to avoid the color white. It may also be desirable incorporate patterns to aid the color blind. Also, the concept of a visual cue can include the use of Brail to allow the blind to make use of an embodiment of the invention.

It should also be noted that visual cues according to an embodiment of the invention can also be applied to check images or pages of check images sent with so-called "image" statements. Of course, visual cues can be applied where check truncation results in statements being sent with no checks or images. For convenience, statement dates can be selected so that statements will cycle and print with all the same visual cues in one print run. Additionally, the use of an embodiment of the invention does not preclude a customer requesting that statements from different accounts be mailed together, but with the appropriate visual cue on each one.

Figure 2:
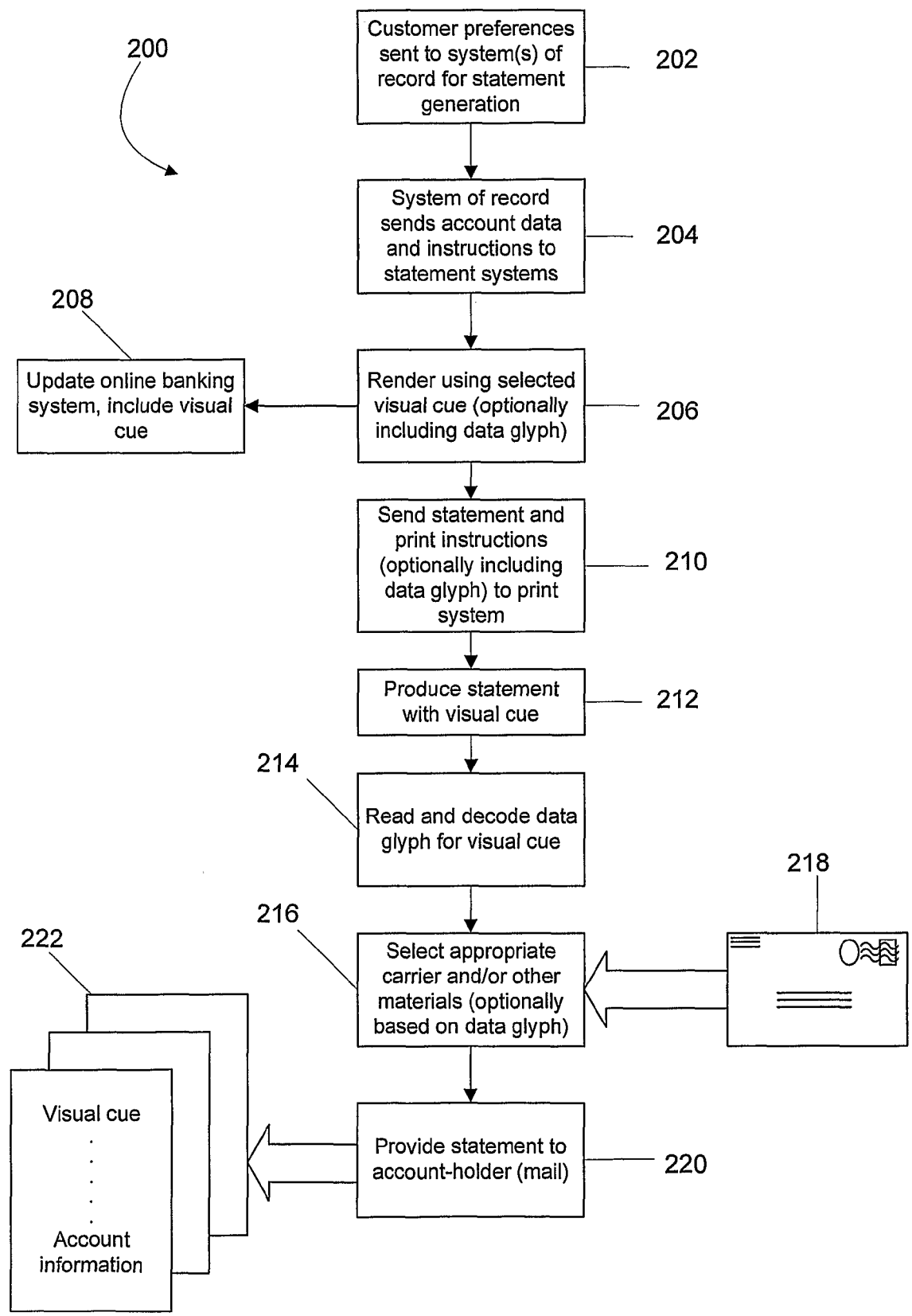
FIG. 2 is a flowchart showing one example of how bank statements might be generated using distinctive visual cues according to some embodiments of the invention.

FIG. 2 is a flowchart which illustrates an example process, 200, for generating account statements using the visual cues of an embodiment of the invention. In at least some embodiments, the preferences databases will determine when a statement is to be generated, using information from the printing system. At block 202 of process 200, appropriate customer preferences are sent to the system of record for statement generation. The system of record is whichever system stores the appropriate date and account transaction information to be used in generating the statement. The nature and type of system of record will depend on both the financial institution implementing the invention, and the type of account. For example, with a checking account, a transactions database is often maintained by a bank or similar financial institution. At block 204, the system of record combines the account data and the appropriate instructions with respect to obtaining the visual cue from a customer information database. At block 206 a statement is rendered using the selected visual cue. Optionally, a data glyph can be included to facilitate the matching of the statement with the appropriate envelope or other carrier, so that the visual cue is maintained on those materials as well. Processing branches in two directions from block 206 of process 200. Processing branches to block 208 to update the appropriate online banking systems to include the visual cue in online statements. In parallel, processing also continues to block 210 where the appropriate statement information and print instructions are sent to the print system.

Still referring to FIG. 2, a statement is printed with the appropriate visual cue for each account at block 212. Optionally, a mail processing center, mail room, or the like has equipment that can read and decode a data glyph included in the statement. If this option is used, at block 216, the appropriate carrier, such as envelope 218, and/or other materials are optionally selected and combined with the statement for mailing. The use of a data glyph in this fashion enables a bank or financial institution to maintain standard stocks of envelopes and other materials that correspond to a library of visual cues, without having to identify such items to specific accounts. At block 220 of FIG. 2, the statement is provided to the account holder, for example, via postal mail. Of course, if a data glyph is not used, mailing stock can be matched to paper documents through a more traditional, manual or semi-manual process.

Again in FIG. 2, statements are represented by media 222. Each statement is a document embodied in the media which includes the visual cue and appropriate account information. For a statement, the account information includes a list of transactions and dates, account numbers, and may include additional information such as overdraft line of credit balances, the names of others who might have signature authority on the account, etc.

It should be noted that for purposes of this example embodiment, the data glyph referred to above, is of a standard, printed format that can be used to print graphic elements that can not normally be read by a human eye, but can be read by an optical scanner with appropriate software or microcode to interpret the glyph. Data glyphs can include thousands of bytes of digital information in unobtrusive patterns that can appear as backgrounds, shade patterns, or conventional graphic design elements. Such patterns contain digitally encoded information that is often used for finishing instructions, authenticity verification, print verification, and many other applications. Note also that the process describe above can be used for any document, including overdraft notifications, correction notices, etc.

Figure 3:
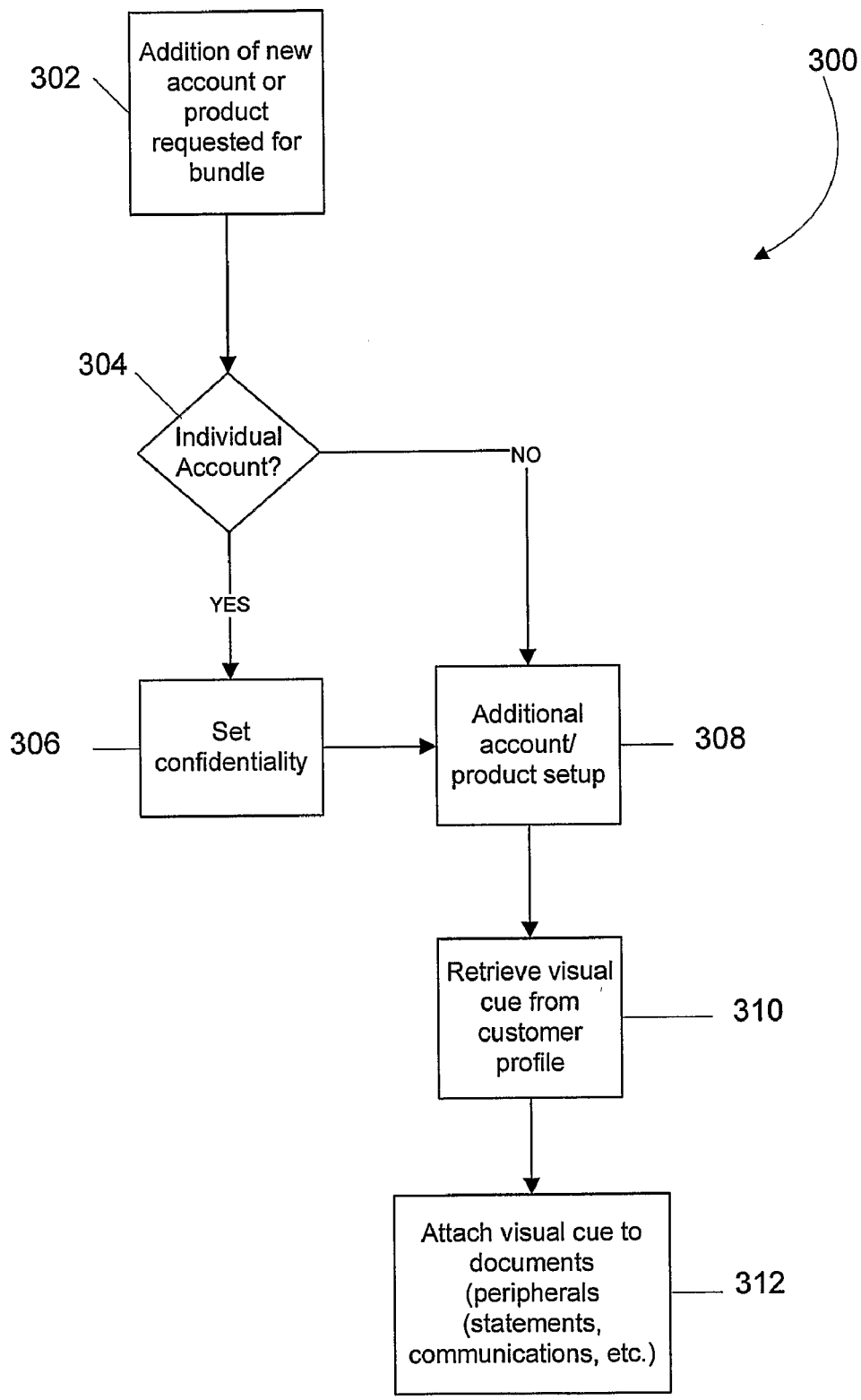
FIG. 3 is a flowchart illustrating how a new account using a distinctive visual cue can be added to a bundle of accounts.

FIG. 3 shows a high level flowchart of a process 300 for adding a new account or product to a bundle of accounts, wherein an account-holder already has a visual cue identified in the customer or account profile. The process of adding a new account or product to the account bundle begins at block 302. At block 304, processing branches depending on whether the account is to be an individual account, or a joint account. If an individual account is selected, the confidentiality flag is set or not at block 306. Otherwise, processing continues to block 308 where additional account parameters are input in the normal fashion. At block 310, the appropriate visual cue is retrieved from the customer or account profile and at block 312 this visual cue is attached to account documents that are generated for the account. In the future it can be attached to statements, ATM displays, online displays, peripherals, and other communications on an ongoing basis.

Figure 4:
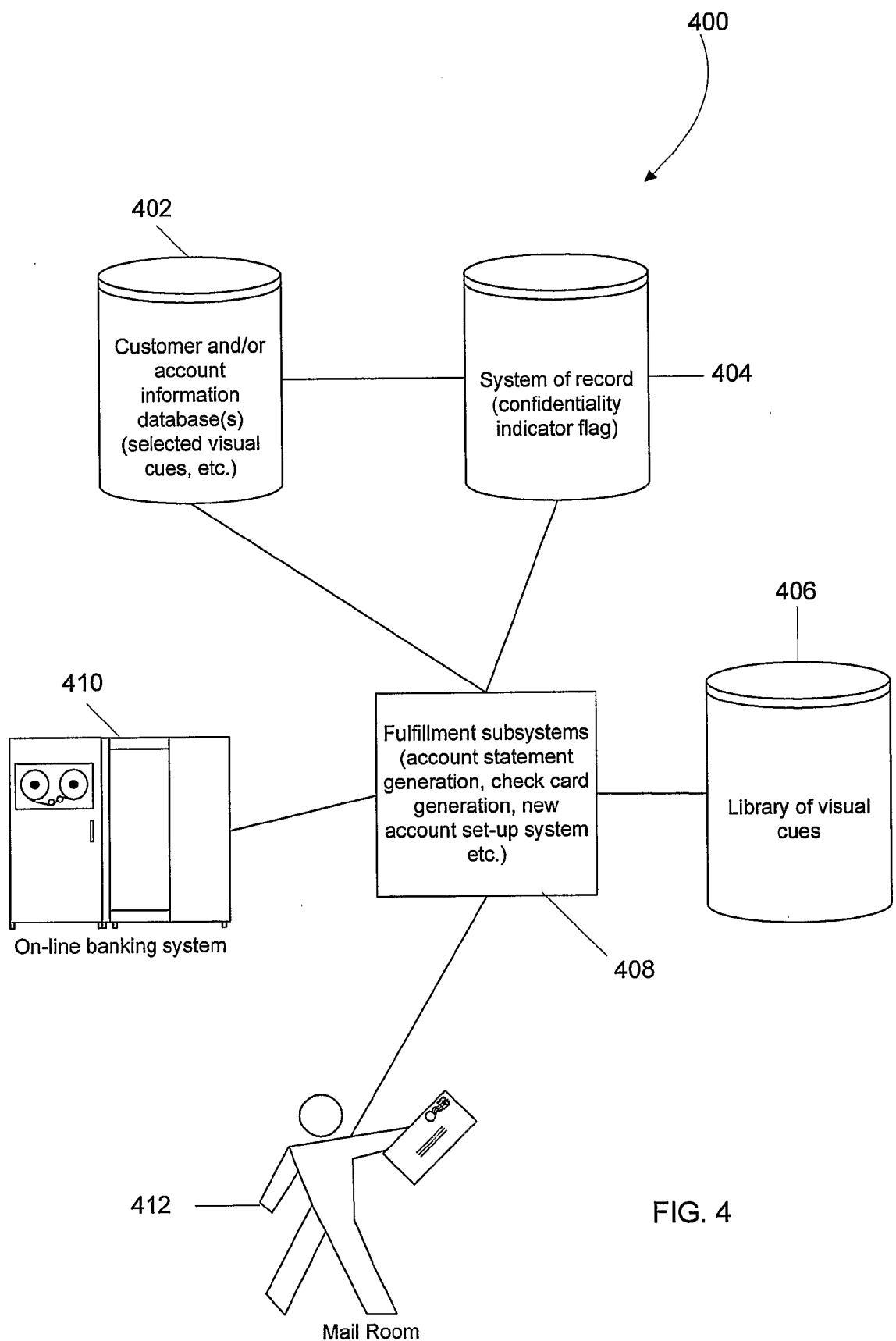
FIG. 4 is a schematic, system block diagram illustrating a system according to at least some embodiments of the present invention.

FIG. 4 is a system block diagram that illustrates, at a high level, one example system which could be used to implement embodiments of the invention. System 400 of FIG. 4 includes information databases 402, which may include customer preferences and account preferences, and at least one system of record, 404, which may include confidentiality flags to alert employees and others of the confidential status of certain accounts in some bundles. For example, the system of record may be the transactions database if an account is a checking account. Alternatively, the system of record may be a credit card database if one of the accounts is a credit card account. These systems could of course be combined. Database 406 includes a library of visual cues which can be selected by new customers to associate with specific accounts or specific account-holders.

Still referring to FIG. 4, fulfillment subsystems 408 include all of the various systems that allow the financial institution to fulfill customer requests and needs. These include statement generation, checkcard generation, new account setup systems, and others. These systems typically interface with online banking system 410 to provide the functionality of the invention for information presented to customers online. Mailroom 412 is also schematically represented in FIG. 4 since paper documents which implement aspects of the invention may also be combined with envelopes or other carriers and mailed to customers. It should be understood that all or parts of any or all of the functions described for the example system can be performed by vendors or contractors of a financial institution. In such a situation, the producing outputs and providing items to customers or between parts of a system from the perspective of a bank includes engaging such contractors or vendors to handle these aspects of the process of an embodiment of the invention.

It will be readily understood to those of skill in the art that various data processing systems, databases, and other typical computing resources would be used to implement the invention in a typical environment. These computing platforms and instruction execution systems include central processing units, memory, storage media, and computer program code in the form of computer software. Various functions can be performed either on stand-alone systems or on systems interconnected with the network such as illustrated by system 400 of FIG. 4. Since such computing networks and platforms are so well understood in the art they are not being disclosed in any further detail here.

Specific embodiments of an invention are described herein. The inventive concepts have other applications as other environments. The following claims are not intended to limit the scope of the invention to the specific embodiments described.

The invention claimed is:

1. A method of producing statements for a plurality of accounts, the method comprising:
    assigning, using a processor, a first distinctive visual cue to a first account in the plurality of accounts, wherein the plurality of accounts are maintained by the same institution, and wherein the first distinctive visual cue is non-alphanumeric and distinct from conventional account information including the account number, transactions for the account, and authorized users for the account such that the first distinctive visual cue enables an account-holder for the first account to readily identify the first account from among the plurality of accounts by viewing the first distinctive visual cue;
    producing, using a processor, a first statement for the first account, wherein the producing comprises incorporating the first distinctive visual cue prominently into the first statement such that the account-holder can readily identify, by viewing the first distinctive visual cue, the first statement as being associated with the first account;
    assigning a second distinctive visual cue to a second account in the plurality of accounts, wherein the second distinctive visual cue is different from the first distinctive visual cue and is non-alphanumeric and distinct from conventional account information including the account number, transactions for the account, and authorized users for the account such that the second distinctive visual cue enables an account-holder for the second account to readily identify the second account from among the plurality of accounts by viewing the second distinctive visual cue;
    producing a second statement for the second account, wherein the producing comprises incorporating the second distinctive visual cue prominently into the second statement such that the account-holder can readily identify, by viewing the second distinctive visual cue, the second statement as being associated with the second account;
    providing the first statement and the second statement to the account-holder(s).

2. The method of claim 1 wherein the first distinctive visual cue comprises at least one of a color, a logo, a background, a graphic, or a photo and the second distinctive visual cue comprises at least one of a different color, logo, background, graphic, or photo.

3. The method of claim 1 wherein the producing of the first or second statement comprises at least one of printing the statement or storing the statement for on-line access.

4. The method of claim 1 further comprising providing at least one peripheral for the first account and incorporating the first distinctive visual cue into the at least one peripheral.

5. The method of claim 2 wherein the producing of the first or second statement comprises at least one of printing the statement or storing the statement for on-line access.

6. The method of claim 2 further comprising providing at least one peripheral for the first account and incorporating the first distinctive visual cue into the at least one peripheral.

7. The method of claim 3 further comprising providing at least one peripheral for the first account and incorporating the first distinctive visual cue into the at least one peripheral.

8. An apparatus for producing statements for a plurality of accounts, the apparatus comprising:
    means for assigning a first distinctive visual cue to a first account in the plurality of accounts, wherein the plurality of accounts are maintained by the same institution, and wherein the first distinctive visual cue is non-alphanumeric and distinct from conventional account information including the account number, transactions for the account, and authorized users for the account such that the first distinctive visual cue enables an account-holder for the first account to readily identify the first account from among the plurality of accounts by viewing the first distinctive visual cue;

means for producing a first statement for the first account, wherein the producing means is configured to incorporate the first distinctive visual cue prominently into the first statement such that the account-holder can readily identify, by viewing the first distinctive visual cue, the first statement as being associated with the account;

means for assigning a second distinctive visual cue to a second account in the plurality of accounts, wherein the second distinctive visual cue is different from the first distinctive visual cue and is non-alphanumeric and distinct from conventional account information including the account number, transactions for the account, and authorized users for the account such that the second distinctive visual cue enables an account-holder for the second account to readily identify the second account from among the plurality of accounts by viewing the second distinctive visual cue;

means for producing a second statement for the second account, wherein the producing comprises incorporating the second distinctive visual cue prominently into the second statement such that the account-holder can readily identify, by viewing the second distinctive visual cue, the second statement as being associated with the second account; and means for providing the first statement and the second statement to the account-holder(s).

9. The apparatus of claim 8 further comprising means for providing at least one peripheral for the first account and incorporating the first distinctive visual cue into the at least one peripheral.

10. The apparatus of claim 8 further comprising means for associating a confidentiality indicator with at least one account from among the plurality of accounts.

11. The method of claim 1, wherein the assigning the first or second distinctive visual cue to the first or second account is based at least partially on the first or second distinctive visual cue being assigned to the account-holder.

12. The method of claim 1, wherein the first and second distinctive visual cues were selected by the account-holder(s).

13. The method of claim 1, wherein the first and second distinctive visual cues were selected from a library of available distinctive visual cues.

14. The method of claim 1, further comprising:
associating a confidentiality indicator with at least one account from among the plurality of accounts.

15. The apparatus of claim 8, wherein the assigning means is configured to assign the first or second distinctive visual cue to the first or second account based at least partially on the first or second distinctive visual cue being assigned to the account-holder.

16. The apparatus of claim 8, wherein the first and second distinctive visual cues were selected by the account-holder(s).

17. The apparatus of claim 8, wherein the first and second distinctive visual cues were selected from a library of available distinctive visual cues.

18. A method of producing statements for a plurality of accounts, the method comprising:

assigning, using a processor, a first distinctive visual cue comprising a first distinctive color to a first account in the plurality of accounts, wherein the plurality of accounts are maintained by the same institution, and wherein the first distinctive visual cue is non-alphanumeric and distinct from conventional account information including the account number, transactions for the account, and authorized users for the account such that the first distinctive visual cue enables an account-holder for the first account to readily identify the first account from among the plurality of accounts by viewing the first distinctive visual cue;

producing, using a processor, a first statement for the first account, wherein the producing comprises incorporating the first distinctive visual cue that comprises a first distinct color prominently into the first statement such that the account-holder can readily identify, by viewing the first distinctive visual cue, the first statement as being associated with the first account;

assigning a second distinctive visual cue comprising a second distinctive color different from the first distinctive color to a second account in the plurality of accounts, wherein the second distinctive visual cue is non-alphanumeric and distinct from conventional account information including the account number, transactions for the account, and authorized users for the account such that the second distinctive visual cue enables an account-holder for the second account to readily identify the second account from among the plurality of accounts by viewing the second distinctive visual cue;

producing a second statement for the second account, wherein the producing comprises incorporating the second distinctive visual cue that comprises a second distinctive color prominently into the second statement such that the account-holder can readily identify, by viewing the second distinctive visual cue, the second statement as being associated with the second account;

providing the first statement and the second statement to the account-holder(s).

19. The method of claim 18 wherein the producing of the first or second statement comprises at least one of printing the statement or storing the statement for on-line access.

20. The method of claim 18 further comprising providing at least one peripheral for the first account and incorporating the first distinctive visual cue into the at least one peripheral.

21. The method of claim 18, wherein the assigning the first or second distinctive visual cue to the first or second account is based at least partially on the first or second distinctive visual cue being assigned to the account-holder.

22. The method of claim 18, wherein the first and second distinctive visual cues were selected by the account-holder(s).

23. The method of claim 18, wherein the first and second distinctive visual cues were selected from a library of available distinctive visual cues.

24. The method of claim 18, further comprising:
associating a confidentiality indicator with at least one account from among the plurality of accounts.

25. An apparatus for producing statements for a plurality of accounts, the apparatus comprising:
means for assigning a first distinctive visual cue comprising a first distinctive color to a first account in the plurality of accounts, wherein the plurality of accounts are maintained by the same institution, and wherein the first distinctive visual cue is non-alphanumeric and distinct from conventional account information including the account number, transactions for the account, and authorized users for the account such that the first distinctive visual cue enables an account-holder for the first account to readily identify the first account from among the plurality of accounts by viewing the first distinctive visual cue;

means for producing a first statement for the first account, wherein the producing comprises incorporating the first distinctive visual cue that comprises a first distinct color prominently into the first statement such that the account-holder can readily identify, by viewing the first distinctive visual cue, the first statement as being associated with the first account;

means for assigning a second distinctive visual cue comprising a second distinctive color different from the first distinctive color to a second account in the plurality of accounts, wherein the second distinctive visual cue is non-alphanumeric and distinct from conventional account information including the account number, transactions for the account, and authorized users for the account such that the second distinctive visual cue enables an account-holder for the second account to readily identify the second account from among the plurality of accounts by viewing the second distinctive visual cue;

means for producing a second statement for the second account, wherein the producing comprises incorporating the second distinctive visual cue that comprises a second distinctive color prominently into the second statement such that the account-holder can readily identify, by viewing the second distinctive visual cue, the second statement as being associated with the second account;

means for providing the first statement and the second statement to the account-holder(s).

26. The apparatus of claim 25 further comprising means for providing at least one peripheral for the first account and incorporating the first distinctive visual cue into the at least one peripheral.

27. The apparatus of claim 25 further comprising means for associating a confidentiality indicator with at least one account from among the plurality of accounts.

28. The apparatus of claim 25, wherein the assigning means is configured to assign the first or second distinctive visual cue to the first or second account based at least partially on the first or second distinctive visual cue being assigned to the account-holder.

29. The apparatus of claim 25, wherein the first and second distinctive visual cues were selected by the account-holder(s).

30. The apparatus of claim 25, wherein the first and second distinctive visual cues were selected from a library of available distinctive visual cues.

31. A method of producing statements for a plurality of accounts, the method comprising:

assigning, using a processor, a first distinctive visual cue comprising a first distinctive non-alphanumeric graphic to a first account in the plurality of accounts, wherein the plurality of accounts are maintained by the same institution, and wherein the first distinctive visual cue is distinct from conventional account information including the account number, transactions for the account, and authorized users for the account such that the first distinctive visual cue enables an account-holder for the first account to readily identify the first account from among the plurality of accounts by viewing the first distinctive visual cue;

producing, using a processor, a first statement for the first account, wherein the producing comprises incorporating the first distinctive visual cue that comprises a first distinctive non-alphanumeric graphic prominently into the first statement such that the account-holder can readily identify, by viewing the first distinctive visual cue, the first statement as being associated with the first account;

assigning a second distinctive visual cue comprising a second distinctive non-alphanumeric graphic different from the first distinctive non-alphanumeric graphic to a second account in the plurality of accounts, wherein the second distinctive visual cue is distinct from conventional account information including the account number, transactions for the account, and authorized users for the account such that the second distinctive visual cue enables an account-holder for the second account to readily identify the second account from among the plurality of accounts by viewing the second distinctive visual cue;

producing a second statement for the second account, wherein the producing comprises incorporating the second distinctive visual cue that comprises a second distinctive non-alphanumeric graphic prominently into the second statement such that the account-holder can readily identify, by viewing the second distinctive visual cue, the second statement as being associated with the second account;

providing the first statement and the second statement to the account-holder(s).

32. The method of claim 31 wherein the producing of the first or second statement comprises at least one of printing the statement or storing the statement for on-line access.

33. The method of claim 31 further comprising providing at least one peripheral for the first account and incorporating the first distinctive visual cue into the at least one peripheral.

34. The method of claim 31, wherein the assigning the first or second distinctive visual cue to the first or second account is based at least partially on the first or second distinctive visual cue being assigned to the account-holder.

35. The method of claim 31, wherein the first and second distinctive visual cues were selected by the account-holder(s).

36. The method of claim 31, wherein the first and second distinctive visual cues were selected from a library of available distinctive visual cues.

37. The method of claim 31, further comprising:
associating a confidentiality indicator with at least one account from among the plurality of accounts.

38. An apparatus for producing statements for a plurality of accounts, the apparatus comprising:

means for assigning a first distinctive visual cue comprising a first distinctive non-alphanumeric graphic to a first account in the plurality of accounts, wherein the plurality of accounts are maintained by the same institution, and wherein the first distinctive visual cue is distinct from conventional account information including the account number, transactions for the account, and authorized users for the account such that the first distinctive visual cue enables an account-holder for the first account to readily identify the first account from among the plurality of accounts by viewing the first distinctive visual cue;

means for producing a first statement for the first account, wherein the producing comprises incorporating the first distinctive visual cue that comprises a first distinctive non-alphanumeric graphic prominently into the first statement such that the account-holder can readily identify, by viewing the first distinctive visual cue, the first statement as being associated with the first account;

means for assigning a second distinctive visual cue comprising a second distinctive non-alphanumeric graphic different from the first distinctive non-alphanumeric graphic to a second account in the plurality of accounts, wherein the second distinctive visual cue is distinct from conventional account information including the account number, transactions for the account, and authorized users for the account such that the second distinctive visual cue enables an account-holder for the second account to readily identify the second account from among the plurality of accounts by viewing the second distinctive visual cue;

means for producing a second statement for the second account, wherein the producing comprises incorporating the second distinctive visual cue that comprises a second distinctive non-alphanumeric graphic prominently into the second statement such that the account-holder can readily identify, by viewing the second distinctive visual cue, the second statement as being associated with the second account;

means for providing the first statement and the second statement to the account-holder(s).

39. The apparatus of claim 38 further comprising means for providing at least one peripheral for the first account and incorporating the first distinctive visual cue into the at least one peripheral.

40. The apparatus of claim 38 further comprising means for associating a confidentiality indicator with at least one account from among the plurality of accounts.

41. The apparatus of claim 38, wherein the assigning means is configured to assign the first or second distinctive visual cue to the first or second account based at least partially on the first or second distinctive visual cue being assigned to the account-holder.

42. The apparatus of claim 38, wherein the first and second distinctive visual cues were selected by the account-holder(s).

43. The apparatus of claim 38, wherein the first and second distinctive visual cues were selected from a library of available distinctive visual cues.

* * * * *